J. F. PARKER.
CASH REGISTER.
APPLICATION FILED JAN. 19, 1909.
1,022,868.
Patented Apr. 9, 1912.
6 SHEETS—SHEET 4.
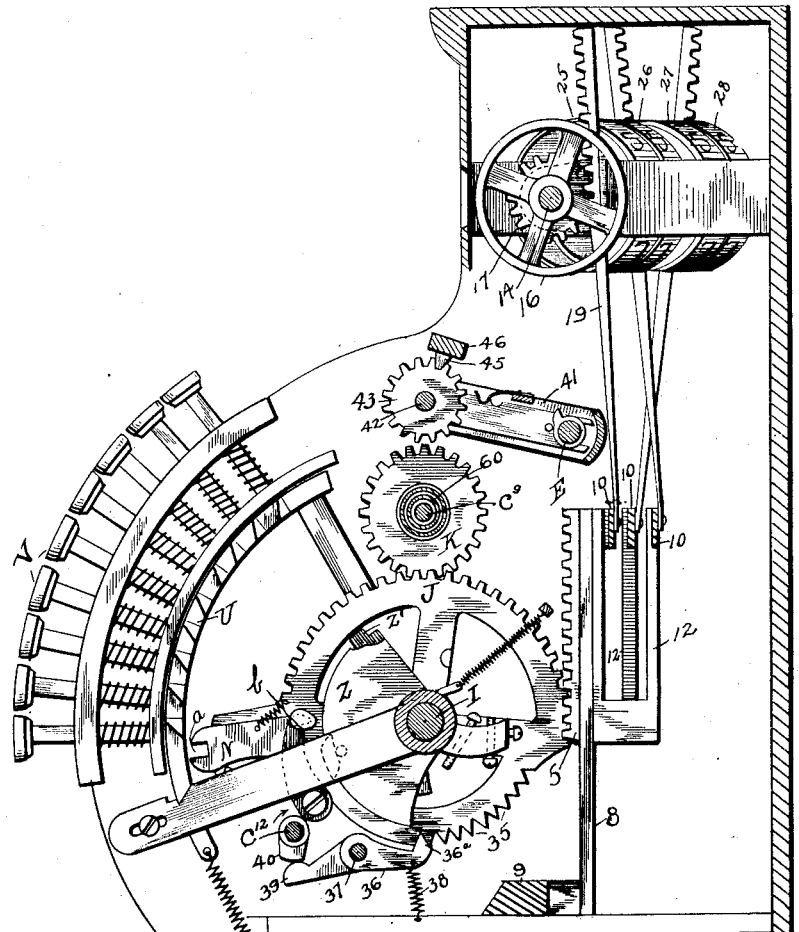
Fig. 4.
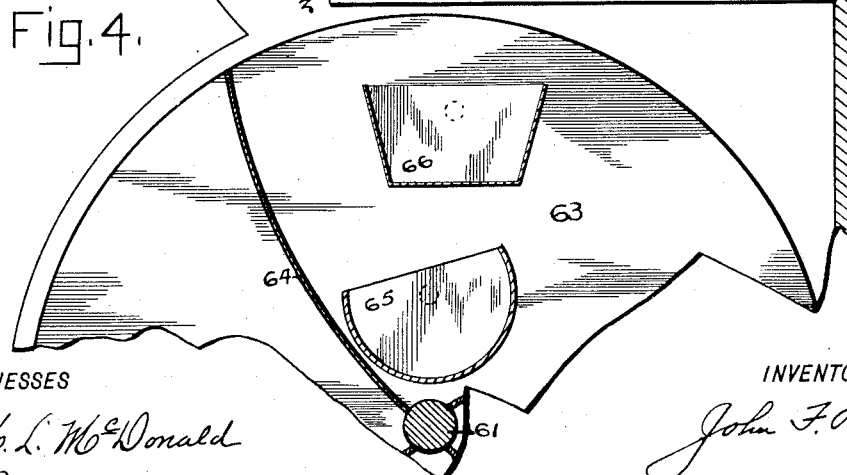
WITNESSES
M. L. McDonald
C. H. Ballard
INVENTOR
John F. Parker

J. F. PARKER.
CASH REGISTER.
APPLICATION FILED JAN. 19, 1909.

1,022,868.

Patented Apr. 9, 1912.

6 SHEETS—SHEET 5.

J. F. PARKER.
CASH REGISTER.
APPLICATION FILED JAN. 19, 1909.

1,022,868.

Patented Apr. 9, 1912.
6 SHEETS—SHEET 6.

WITNESSES
M. L. McDonald
C. H. Ballard

INVENTOR
John F. Parker

UNITED STATES PATENT OFFICE.

JOHN F. PARKER, OF KANSAS CITY, MISSOURI, ASSIGNOR TO THE NATIONAL CASH REGISTER COMPANY, OF DAYTON, OHIO, A CORPORATION OF OHIO, (INCORPORATED IN 1906.)

CASH-REGISTER.

1,022,868.     Specification of Letters Patent.     Patented Apr. 9, 1912.

Application filed January 19, 1909. Serial No. 473,061.

*To all whom it may concern:*

Be it known that I, JOHN F. PARKER, a citizen of the United States, residing at Kansas City, in the county of Jackson and State of Missouri, have invented an Improvement in Cash-Registers, of which the following is a specification.

My invention consists of certain improvements in cash registers such as those shown and described in Letters Patent of the United States No. 464,294, dated December 1, 1891 and No. 483,511, dated September 27, 1892, granted to Hugo Cook, also the style of machines embodied in Patents Nos. 913,550 and 913,551 issued to me February 23, 1909, and my copending application Serial No. 479,000, filed February 19, 1909. It will be understood however that the improvements are not restricted to these machines alone but are applicable to others also.

One of the distinctive features of this invention is to provide a register with a plurality of cash receptacles.

Another distinctive feature is the arrangement of the indicating devices, whereby the amounts are exhibited in two different directions at obtuse angles relative to the front of the machine, thus giving a much greater range of view than in registers where they are arranged parallel with the front of it.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1:
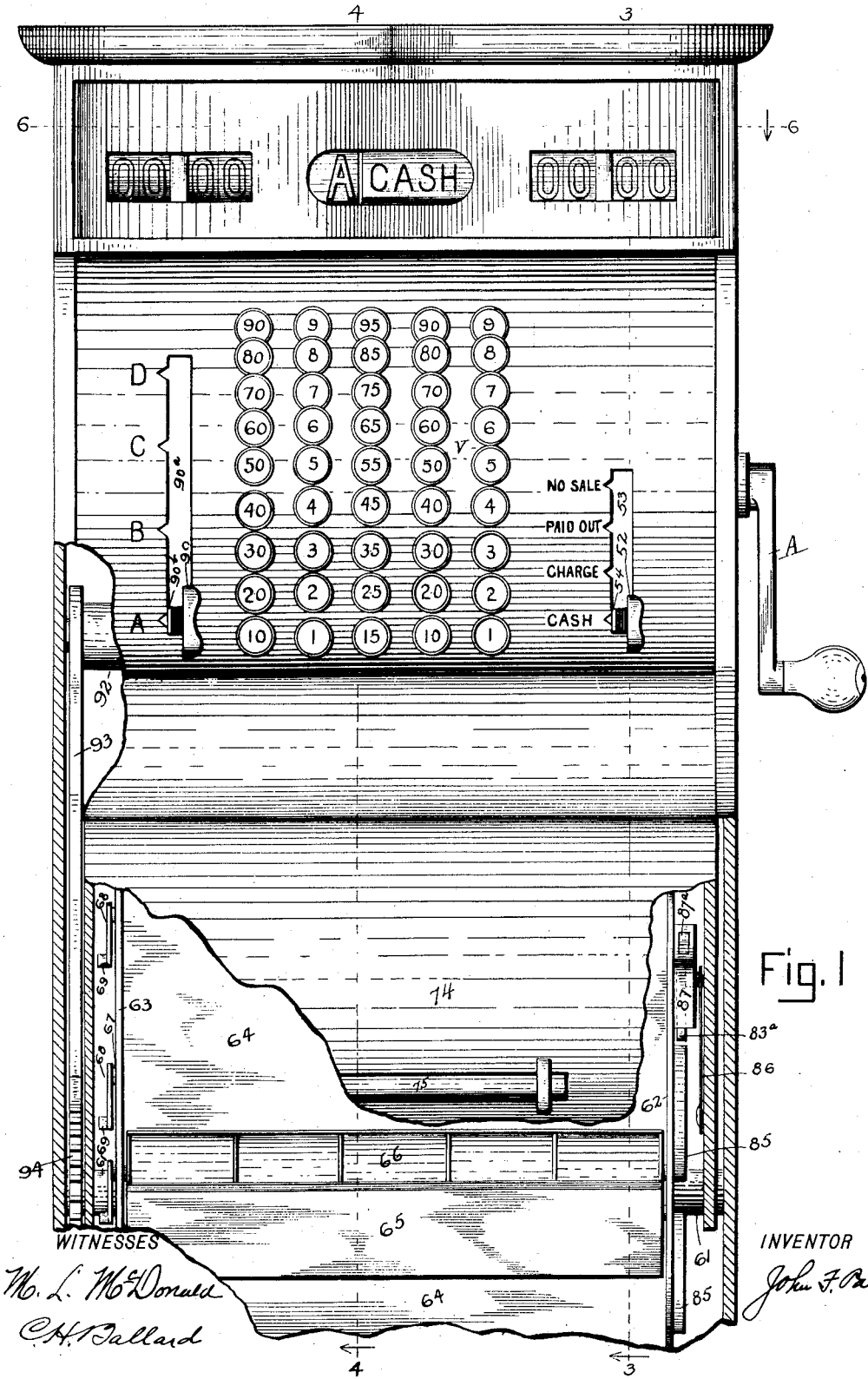
Figure 2:
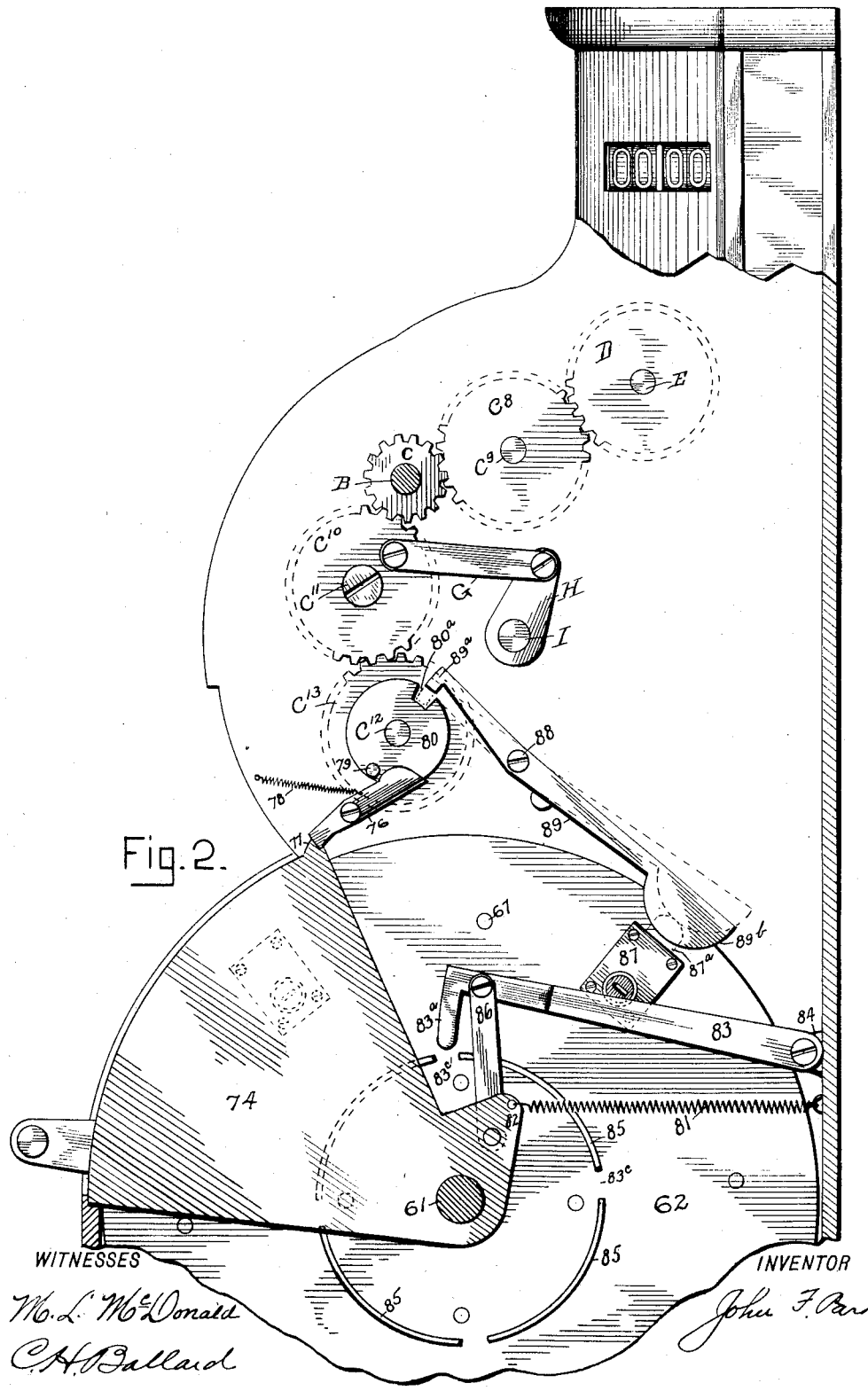
Figure 3:
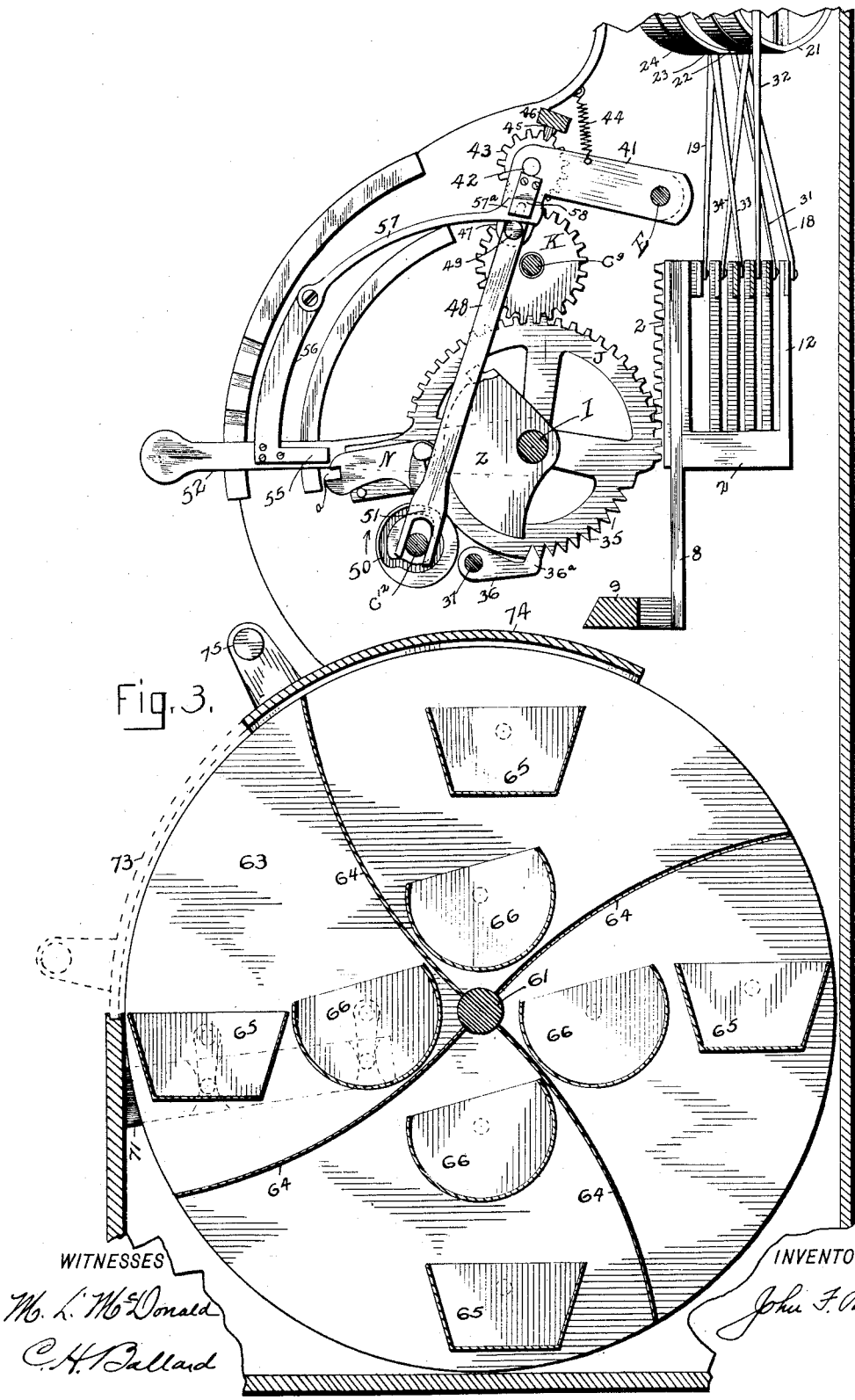
Figure 5:
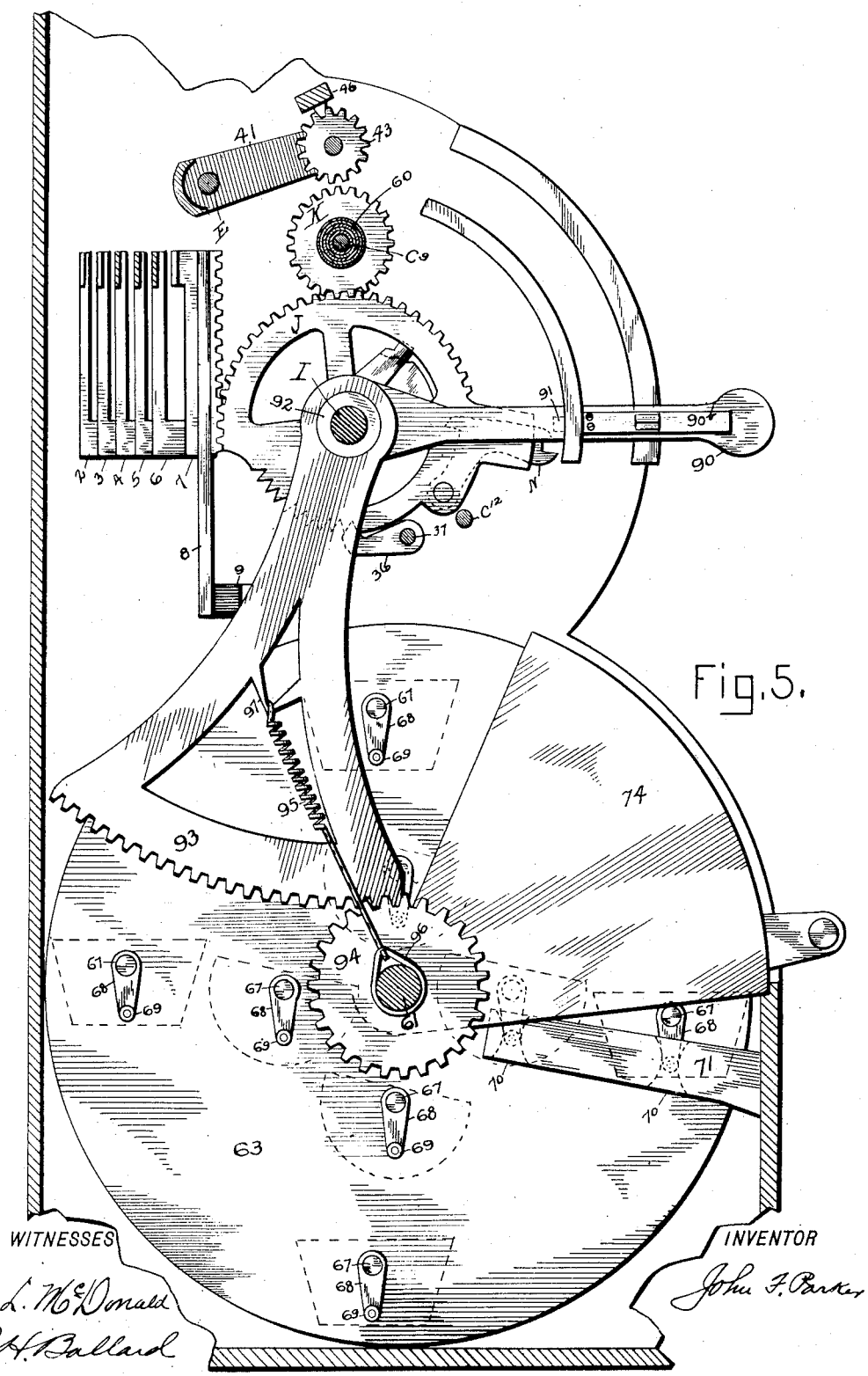
Figure 6:
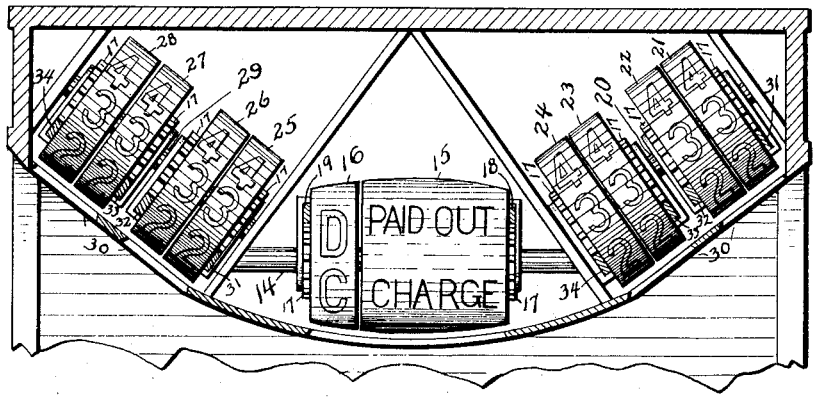
Figure 7:
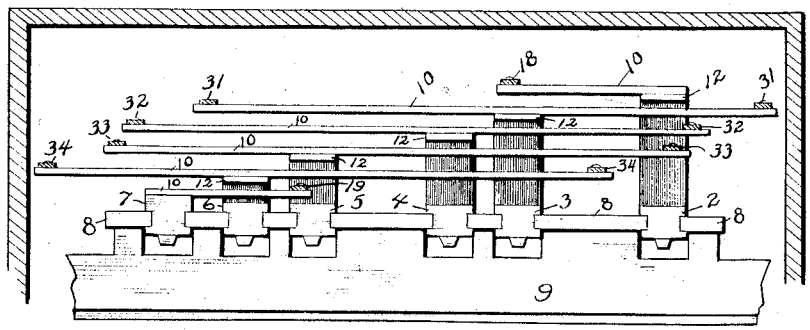
Figure 10:
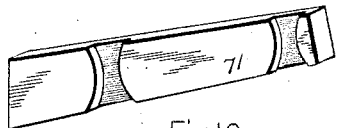
Figure 8:
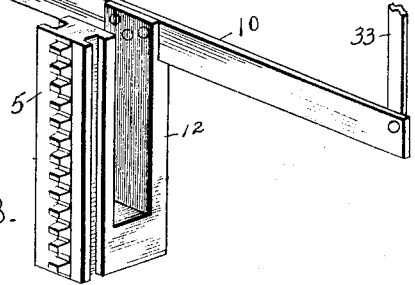
Figure 9:
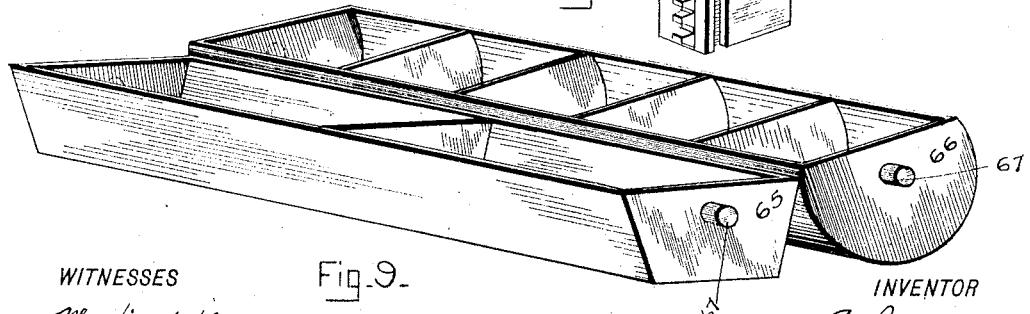

Figure 1 is mainly a front elevation of the machine with portions of the casing removed to show interior constructions; Fig. 2 is a right hand end view of the machine with most of the casing removed; Fig. 3 is a transverse vertical section on the line 3—3 of Fig. 1; Fig. 4 is a transverse vertical section on the line 4—4 of Fig. 1; Fig. 5 is a left hand end view of the machine with the casing removed; Fig. 6 is a horizontal section on the line 6—6 of Fig. 1, showing the relative position of the three series of indicating wheels; Fig. 7 is a horizontal section looking down on the vertically slidable racks, and the attached horizontal bars which support the supplemental rack bars for operating the indicating wheels; Fig. 8 is a perspective view of one of the slidable racks and connected parts; Fig. 9 is a perspective view of one of the sets of cash receptacles; Fig. 10 is a perspective view of a guide arm.

The same letters and numerals of reference are used to indicate identical parts in all the figures.

The type of cash register to which my invention is applied is fully described in the Patent 464,294 heretofore referred to, so that I shall describe only so much of that machine as is necessary to an understanding of my improvements, reference being had for a fuller description to the prior art which is well known.

An operating handle A is fast on the end of a short shaft B which also has fast upon it a gear C that meshes with the gear $C^8$ which is fast on the end of a horizontal shaft $C^9$ that extends across the machine. Meshing with the gear $C^8$ is a gear D fast upon a horizontal shaft E which extends across the machine parallel to the shaft $C^9$. The gear C also meshes with a gear $C^{10}$ mounted upon a stub shaft $C^{11}$ projecting from the side frame of the machine and this gear $C^{10}$ meshes with a similar gear $C^{13}$ secured to one end of a horizontal shaft $C^{12}$ which extends across the length of the machine. A pitman G is secured to the side of the gear $C^{10}$ and the free end of the crank arm H, the latter being secured to an oscillatory shaft I. The ratio of the gearing just described is such that for every two rotations of the gear C the remainder of the gears will be given one rotation and by the rotation of the gear $C^{10}$ the shaft I will be oscillated.

Loosely mounted upon the central shaft I, is a series of, what might be called, "combination" gears J, one being provided for each of the four series of keys and two setting-levers, the upper peripheral portion of each of the said gears J being gear toothed, while the lower portion has star teeth formed upon it. As shown in Fig. 4, the gear J is in mesh with a gear K, which in turn is adapted to mesh with a gear 43 forming part of the registering mechanism. These gears J also mesh with a series of vertically adjustable racks 2, 3, 4, 5, 6, and 7 which are provided with lateral grooves which receive vertical fixed guides 8, the same being attached to a horizontal portion 9 of the frame. Thus in the oscillation of the gears J, upon the shaft I, vertical reciprocation is imparted to the aforesaid racks 2, 3, 4, 5, 6, 7. Horizontal bars 10, see Figs. 7 and 8, are rigidly connected with the several racks, the attachment being substantially the same as shown and described in my Patent No. 913,550, before referred to. That is to say, the inner horizontal bar 10 is attached directly to the back of the left hand rack 7, but the other five racks are provided with arms 12, which are arranged parallel to, and spaced from, the bodies of the racks in order to accommodate the bars 10 attached to adjacent racks. Thus space is provided between the arms and bodies of a rack for vertical movement of the horizontal bars 10, as required for operating the indicating wheels, hereinafter described. As shown in Fig. 7, it will be seen that the horizontal bars 10 are all arranged parallel but are of different lengths, to bring their end portions in the position required relative to the indicating wheels with which they are operatively connected, and which will now be described.

Mounted loosely upon a horizontal shaft 14, which is supported in the upper central portion of the machine and parallel with the front of it, see Fig. 6, are two rotatable indicating wheels 15 and 16, each having attached to one side thereof a pinion 17. The periphery of the first named indicating-wheel 15 is inscribed with words denoting different transactions, such as "Cash" "Charge" "Paid out" and "No sale." In mesh with the pinion of the said wheel 15 is a supplemental rack-bar 18 extending downward and attached to the horizontal bar 10 which is rigidly secured to the arm 12 of the rack 2. The periphery of the other indicating-wheel 16 is inscribed with letters to indicate the initial of a clerk, and in the same manner as the indicating wheel 15, it is operatively connected with its rack 7, through the means of a supplemental rack bar 19 attached to the horizontal bar 10 secured to the arm 12 of the rack 7. In this manner the degree of reciprocation of the racks will adjust the indicating wheels accordingly.

Mounted loosely upon a horizontal shaft 20, see Fig. 6, which is supported in the upper right hand portion of the machine, and in the same horizontal plane with the shaft 14 but extending at an obtuse angle, is arranged a series of four rotatable indicating wheels 21, 22, 23, and 24, their peripheries inscribed with the numerals 0 to 9 inclusive, and the said wheels, from right to left, representing units of cents, tens of cents, units of dollars, and tens of dollars. To each of these wheels is attached a pinion 17 in mesh with a supplemental rack bar operatively connecting the wheel with a vertically adjustable rack, hereinafter described. In like manner is another series of four rotatable amount indicating wheels 25, 26, 27 and 28 mounted upon a horizontal shaft 29 which is supported in the upper left hand portion of the machine, and in the same plane with the shaft 14 heretofore described, but extending at an obtuse angle and in an opposite direction from the shaft 20, just described. The peripheries of these four wheels are inscribed with numerals corresponding with and representing the same numeral values as the wheels 21, 22, 23, and 24, and the arrangement is such that corresponding wheels of both series are adjusted simultaneously and indicate the same amounts through the openings 30 in the casing.

In mesh with the pinions 17 of the two units of cents indicating wheels 21 and 25 are supplemental rack-bars 31, see Figs. 6 and 7, which are attached to the ends of the horizontal bar 10 that is secured to the arm 12 of the rack 3, the said rack being in mesh with the gear J, which is adjacent to, and operatively connected with, the keys of the units of cents bank. Thus by the depression of any selected key in that bank, and the subsequent operation of the machine, by the handle A, an amount, or numeral, corresponding to the key depressed, will be indicated by a wheel of both series, just described. In the same manner the remaining indicating wheels of both series, representing tens of cents, units of dollars and tens of dollars are operatively connected with keys of the tens of cents, units of dollars and tens of dollars banks. The pinions of the tens of cents indicating wheels 22 and 26 are in mesh with supplemental rack-bars 32, attached to the horizontal bar 10 which is secured to the arm 12 of the rack 4. The pinions 17 of the units of dollars wheels 23 and 27 are in mesh with supplemental rack bars 33 attached to the horizontal bar 10 secured to the arm 12 of the rack 5, see Fig. 8. The pinions of the tens of dollars wheels are in mesh with supplemental rack-bars 34 attached to the horizontal bar 10 secured to the arm 12 of the rack 6.

The operation of the latches N, which are carried on each of the gears J, and their associated parts, is explained at length in the aforesaid Patent 464,294 and it will be sufficient here to state that when a key V, in any of the banks is depressed and caught by the detent plate U, and the shaft B given two complete revolutions the shaft I will be oscillated forward and back. At the end of the forward oscillation of the shaft I the lug $Z^1$, on the side of the cam Z, will engage a recess $b$ in the latch-plate N and in the backward movement of said shaft, will carry the latch-plate, and consequently the gear J with it until the mouth $a$, at the outer end of the latch, engages the inner end of a key which has been depressed, whereupon the lug $Z^1$ will be disengaged from the latch-plate N and the shaft will move on alone, while the latch-plate will be caught upon the key and the gear J arrested at that point.

I will now describe my improved means for positively locking the gears J in their adjusted position, which assures a perfect alinement of the registering and indicating devices.

As heretofore stated, the gear J is provided with a series of star teeth formed upon the lower peripheral portion 35, which are adapted to receive a locking tooth $36^a$ formed on an arm 36, which in turn is fast on rock-shaft 37 extending across the machine, the said locking tooth being normally held out of engagement with the teeth 35, by the tension of a spring 38. Keyed on the rock-shaft 37 is an adjusting arm 39 which contacts with a cam 40 fast on a rotatable shaft $C^{12}$, which has been referred to as making one complete revolution at each operation of the machine, and the arrangements are such, that just as the shaft I begins to oscillate forward, carrying the cam Z and associated parts with it, the cam 40, which moves in the direction of the arrow in Fig. 4, will release the arm 39, thus allowing the tooth of the locking arm 36 to disengage the star teeth of the gear J. The arms 36 and 39 will remain in this position during the further operation of the machine, until just before the limit of the backward movement of the shaft I, whereupon the cam 40 will contact with the free end of the adjusting arm 39 again, pressing it downward and consequently the locking tooth $36^a$ into engagement with the star teeth 35 of the gear J, in this manner locking the gear until the beginning of another operation of the register.

Another improvement upon the aforesaid Patent No. 464,294 is means for adjusting the registering mechanism into and out of engagement with the driving mechanism, one of the results being to dispense with the ratchet-and-pawl connection shown in the above cited patent, and substituting means whereby the registering wheels are in gear with the driving mechanism during the backward indicating and registering movements, and out of gear with it during the forward resetting movements. The registering mechanism proper, in my improvement, is contained in a pivoted frame 41, pivoted on the shaft E. Extending across the forward portion of this frame and secured in the end plates of it, is a shaft 42, upon which are mounted the registering wheels 43 and their associated parts, there being in this construction, four of such wheels corresponding with the four series of amount registering keys with which they are operatively connected. The frame 41 is normally held upward by a spring 44, and thus the registering wheels 43 are out of mesh with the gears K. In this suspended position the wheels 43 are locked from accidental movement by a lug 45 formed on a horizontal bar 46, the lug engaging between two of its teeth, and thus holding them in alinement. The right hand end plate of the pivoted frame 41 has a downward extension 47 (Fig. 3) which is connected by a link 48 to the rotary shaft $C^{12}$, the bottom of said link being forked to straddle said shaft. A cam-groove disk 50, fast upon the said shaft, coöperates with a pin 51 upon the side of the bar 48 to throw it upward and backward at each operation of the machine, the adjustment of the parts being such that the bar will be brought downward at the beginning of a backward movement of the rock shaft I, and thus carry the registering wheels 43 into mesh with the gears K which are in mesh with the gears J mounted on said shaft I, so that the backward movement of the gears J will be transmitted to the registering wheels 43. Just before the shaft I has completed its backward movement, but after the gears J have been given their complete backward movement, the cam 50 will throw the bar 48 upward again, and thus disengage the registering wheels 43 from the gears K, and they will remain so disengaged during the forward movement of the shaft I and gears J at the next operation of the machine. By these means the registering wheels are thrown into gear with the driving mechanism at the beginning of the registering movements and out of gear at the end of the registering movements. The transfers between the different registering wheels 43, are effected by substantially the same devices as shown and described in the Patent No. 464,294 heretofore referred to and need not be described in this case.

As shown in Fig. 3, the key element which controls the indicating wheel 15, which indicates such items as "cash," "charge," "paid out" and "no sale," instead of being a bank of depressible keys, is a vertically adjustable lever 52, which is fulcrumed upon the central shaft I, and adapted to be shifted in the slot 53 in the front of the casing, see Fig. 1, one edge of the slot being provided with notches arranged opposite the words "Cash," "Charge," "Paid out" and "No sale," and the lever provided with a spring catch 54 for engaging the said notches for holding it in position. The lever 52 has a lateral projection or nose 55, which is adapted to contact with the latch N, in the same manner as the inner ends of the depressible keys when they are pushed in, but inasmuch as the location of the nose 55 is always in the path of the latch, regardless of the vertical adjustment of the lever 52, it results that one of the four items, such as cash, charge, etc., will be indicated at each operation of the machine without the necessity of adjusting the lever 52. In other words, should the lever be set opposite the word "Cash" the machine will continue to repeat indicating that particular transaction until a change is desired and the lever readjusted accordingly. The lever 52 is also provided with an attachment for the purpose of throwing into and out of operation the adding or registering mechanism, for among the four items just referred to, there is but one that should be added to the total of the previous amount of sales, that item being indicated by the word "Cash," while the remaining ones, charge, paid out and no sale, should be indicated but not registered. This arrangement is substantially the same as described in my Patent No. 913,551 of February 23rd, 1909, and consists of a curved upward extension 56, attached to the lever 52, and having pivoted to its upper end a bar 57, the free end of said bar having a swell or cam portion 57ª which is adapted to slide in a guide 58 provided at the upper end of the reciprocating bar 48. This end of the bar 48 is provided with a lengthwise slot, shown in dotted lines in Fig. 3, which receives the pin 49 that is attached to the pivoted frame 41 containing the registering mechanism. As shown in Fig. 3, it will be seen that the upper edge or cam portion 57ª of the curved bar 57, is in contact with the guide 58, and its lower edge resting against the pin 49, so that in this position of the parts the frame 41 is rigidly attached to the reciprocating bar 48 and partakes of its movements, this condition existing when the lever 52 is set opposite the word "Cash." It is obvious however that should the lever 52 be raised and adjusted in one of the three upper notches, opposite the words "Charge," "Paid out," or "No sale," the narrow portion of the bar 57 would be interposed between the guide 58 and pin 49, and thus the downward movement of the bar 48 would have no effect upon the frame 41, which would consequently remain in its uppermost position through the tension of the spring 44, and thus the registering mechanism would remain at rest while such items are being indicated. In the former Patent 913,551 there is shown and described a device for preventing operation of the register, at certain positions of the setting lever, but the operation takes place in that patent in a different manner. In the patent a set of intermediate gears are prevented, in certain lever positions, from engaging the register, while in the present case, the register gears themselves normally rock into engagement with the actuating devices, but are prevented from such rocking at certain positions of the lever. Thus it will be seen that the present case is, in this respect, a specific improvement on the earlier patent, and therefore no broad claims on this feature are made in the present case. It would be well to state here, that while such items should not be added yet they should be recorded in some manner, and while I do not show a printing mechanism it will be understood that such printing media, as shown in the Patent No. 483,511 or any similar mechanism may be installed in this machine, and with that contemplated, I provide and show a series of concentric sleeves 60, surrounding the shaft $C^9$ which could be extended into a printing compartment as described in the above cited patent.

Next will be described a novel form of multiple cash receptacle wherein is employed a single receptacle divided into a plurality of compartments, each compartment having a pair of tiltable trays.

Journaled in the end walls of the casing of the machine in the lower central portion, is a horizontal rotatable shaft 61, which has fast upon it near the right hand end, a disk 62, Fig. 2, and near the left hand end a similar disk 63, Fig. 5. The space between these two disks being divided into four longitudinal sections or compartments, by the four plates or walls 64, Fig. 3, which are attached to and connect the disks 62—63. Confined between each of the said walls 64 and pivoted to the disks, are two, or what might be called "a set" of receptacles, consisting of a box-like one 65, divided into compartments suitable for holding paper currency, and another one 66, having a round bottom and divided into smaller compartments suitable for holding coin, see Fig. 9. Attached to the end pieces of each receptacle is a pin or pivot 67, which is supported in the disks 62 and 63, and thus the receptacles hang loosely and are adapted to maintain their normal upright position during the rotation of the shaft 61 around which they swing. The pivots which are attached to the left hand end of the receptacles, extend through the disk 63 a short distance and have fast on their end a pendent arm 68, which has mounted upon it an antifriction roller 69 on its free end, which is adapted to pass through grooves 70 formed in a fixed arm 71 extending inward from the front casing, see dotted lines in Fig. 5. As shown in Figs. 3 and 5 it is obvious that when any one of the four sets of receptacles is adjusted and comes to rest, in the front portion of the machine, the antifriction roller 69 carried on the pendent arm 68, will be resting in the center of the grooves in the fixed arm 71, and thus holding such receptacles in a rigid upright, or their normal position. While there is provided four separate sets of receptacles, it will be seen, by reference to Fig. 3, that there is but one opening 73, that opening being provided with, or protected by a covering 74, which is in the nature of a hood, and having end portions extending inward and pivoted, or loosely mounted upon the shaft 61. The front of this cover is provided with a suitable handle 75, and when closed, as shown in Fig. 2, it becomes locked in that position by a pivoted dog 76 dropping behind a shoulder 77 formed on the rear part of the hood 74, the dog being held against this shoulder by the tension of a spring 78. Upon the operation of the machine a pin 79 projecting from a disk 80 secured to one end of a shaft $C^{12}$ will contact with the rear end of the dog 76 and rock the same about its pivot out of engagement with the shoulder 77 formed on the hood or cover 74. When the cover is thus released it immediately swings open by the tension of a spiral spring 81, as shown in Fig. 2. As the cover swings to the open position it locks the shaft 61 from further or accidental rotation, as long as it remains open. Through this arrangement of the parts, it will be seen that but one of the sets of receptacles can be reached, or is available while the cover is open, and after it is closed it requires an operation of the machine to open it again. The means for locking this shaft consists of an arm 83 pivoted to a bracket 84 formed on the rear wall of the casing, the free end of this arm terminating in a downwardly extending hook $83^a$ which is adapted to engage the spaces $83^c$ between the four segments 85 forming a ring, or band which is attached to the disk 62. Near the free end of this arm 83, is a bar 86, connecting it with the extended portion 82 of the end plate of the cover 74. By this arrangement the cover is free to swing open, but only when the disk 62 is properly adjusted to bring one of the sets of receptacles opposite the opening in the front of the casing. Should an attempt to open the cover otherwise be made, the hook $83^a$ would contact with peripheral portions of the band 85, and consequently prevent the rocking of the cover about the fulcrum shaft 61.

If any clerk desires to leave the store he may by manipulating suitable mechanism lock the machine from operation whenever his compartment of the cash receptacle is brought into position to be exposed, thereby preventing any dishonest clerk from gaining access to his compartment during his absence. This mechanism is as follows: Attached to the disk 62, see Fig. 2, are four ordinary key locks 87, two not shown, and one in dotted lines, provided with a sliding bolt $87^a$. Pivoted at 88 is a bar 89, which normally rests as shown in solid lines in Fig. 2. On the short, or upper end of this bar is formed a hook $89^a$, which is adapted to engage a recess $80^a$ in the disk 80. The longer end of the said bar 89 is in the form of a half circle $89^b$ the curved edge normally resting opposite the bolt $87^a$ of one of the locks 87. As shown in Fig. 2, should there be no bolt of any of the locks 87, thrown out, the bar 89 will remain in the position shown in solid lines, Fig. 2, and the disk 80 free to rotate with the operation of the mechanism, but should the bolt of any lock be thrown out it would contact with the curved portion $89^b$ of the bar 89 and throw it up and consequently the hook portion $89^a$ into the recess $80^a$ of the disk 80, thereby locking the entire operating mechanism of the machine. It will be understood that the lock that is resting opposite the bar 89, corresponds to the set of receptacles which are resting opposite the front cover 74.

In a later application Serial No. 479,000 there is shown a rotatable cash receptacle and controlling means therefor somewhat similar to that disclosed in this application. It is to be understood that the present invention is prior in point of time to that of the later application and any claims to the subject matter of the rotatable cash receptacle common to the two cases are intended to be made in this application. Therefore the later application is to be considered a specific improvement on the present application.

The adjustment of the four sets of receptacles, which are indicated by the letters A, B, C, and D that are inscribed upon the indicating-wheel 16, whereby the selected letter is indicated and the corresponding set of receptacles made available simultaneously, will now be described.

Fulcrumed upon the shaft I, is a vertically adjustable setting-lever 90, adapted to be shifted in the slot $90^a$ in the front of the casing, one edge of the slot being provided with notches arranged opposite the letters "A", "B", "C", and "D", and the lever provided with a spring catch $90^b$ for engaging said notches for holding the lever in position. The said lever 90, has a lateral projection or nose 91 which is adapted to contact with the latch N in the same manner as the lever 52, heretofore described, so that consequently the same letter will be indicated, and the same receptacle will be available at each operation of the machine, without readjusting the lever 90 until a change is desired. Attached fast to the lever 90 is a sleeve 92 mounted to rotate upon the shaft I, and fast on the other end of the said sleeve is a segment gear 93, which is in gear with a pinion 94 fast on the receptacle-carrying-shaft 61, and thus the shaft 61, and with it the cash receptacles, are adjusted through the vertical adjustment of the setting-lever 90. Thus the setting-lever 90 combines to determine, through the vertical adjustment of it, just which set of receptacles will be available, and also which letter will be indicated, when, through the operation of the machine, by the handle A, and associated parts, the receptacle cover 74 is released and the indicating-wheel 16 adjusted. To overcome any excessive momentum that the rotatable shaft 61 might acquire, should the setting-lever 90 be shifted too quickly from one extreme position to the other, a spiral spring 95 is provided, one end attached to a link 97 formed upon the segment gear 93, and the other end anchored to the shaft 61 by a loosely mounted collar 96. Thus it will be seen that as the spring 95 passes in either direction from a line drawn from the center of shaft I to the center of shaft 61 the tension on said spring will gradually increase and as the segment 93 nears the end of its movement in either direction the tension of the spring 95 will cause sufficient friction between the collar 96 and the shaft 61 as to prevent any overthrow or excessive movement of said shaft 61 and the money receptacle which is fast to said shaft.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

Having thus fully described my invention, what I claim as new, and desire to secure by Letters Patent, is—

1. In a cash-register, in combination with an operating mechanism which includes an indicator, a key element, and a registering mechanism, of a rotatable cylindrical construction, a plurality of pivoted receptacles supported by the said construction and means which operatively connect the said rotatable cylindrical construction with the said key element, substantially as described.

2. In a cash register, the combination with an indicator, of a rotatable frame, a plurality of cash receptacles supported in said frame, and a lever having gear connections to rotate said frame and to control the indicator.

3. In a cash-register, the combination with an indicator, a manually adjustable setting-lever, and registering devices, of a rotatable construction, a plurality of pivoted receptacles supported by the said rotatable construction, and means which operatively connect the rotatable construction with both the said setting-lever and indicator, substantially as described.

4. In a cash-register, the combination with an operating mechanism which includes three series of rotatable indicating wheels loosely mounted on separate and independent shafts, a registering mechanism, and key elements which are operatively connected with both the indicating wheels and registering mechanism, of a rotatable construction and a plurality of cash receptacles supported by the same, substantially as described.

5. In a cash-register, the combination with indicating mechanism which includes a rotatable initial-indicating-wheel, of a rotatable cylindrical construction mounted within the casing and containing a plurality of pivoted receptacles, and means which operatively connect the said initial-indicating-wheel with the rotatable construction, substantially as described.

6. In a cash-register, the combination of a casing having an opening, a horizontal shaft journaled in the said casing, a disk or support fast upon and near each end of said shaft, a plurality of receptacles pivoted to and adapted to swing between the said supports, pendent arms 68 attached to the receptacles, a fixed guide arm 71, a pinion fast on the said horizontal shaft, a segment gear 93 in mesh with the said pinion, a manually adjustable setting-lever operatively attached to the said gear, an adjustable cover over said opening, and an indicator which is operatively connected with both adjustable cover and setting-lever, substantially as described.

7. In a cash-register, the combination with a casing having an opening, an adjustable cover over said opening, a horizontal shaft journaled in the said casing, a rotatable cylindrical construction mounted on said shaft, a plurality of pivoted receptacles supported in said construction, key elements, indicating devices, and registering mechanism, of manual means for adjusting the rotatable construction and means dependent upon the operation of the indicating devices and registering mechanism for adjusting the said cover, substantially as described.

8. In a cash-register, the combination with a casing having an opening, a horizontal shaft journaled in the said casing, an adjustable cover pivoted on the said shaft, a rotatable construction mounted fast on said shaft, a plurality of cash receptacles supported by said construction, and a key element which is operatively connected with and adapted to adjust the said rotatable construction, of an indicator which is operatively connected with both the said cover and the key element, substantially as described.

9. In a cash-register, the combination with a casing having an opening in the front portion, an adjustable cover over the said opening, a horizontal shaft journaled in said casing, a cylindrical construction mounted on the said shaft, a plurality of cash receptacles pivoted and supported within the said cylindrical construction, a registering mechanism, and indicating devices, of a key element which is operatively connected with both the said horizontal shaft and indicating devices, substantially as described.

10. In a cash-register, the combination of an indicator, a vertically adjustable rack which is operatively connected with the indicator, guides for said rack, a segment gear J in mesh with said rack, a horizontal shaft I supporting said gear, a casing provided with an opening, an adjustable cover over said opening, a horizontal shaft 61 journaled in the said casing, a rotatable construction mounted on the said shaft 61, a plurality of receptacles pivoted to said construction, pendent arms attached to said receptacles, antifriction rollers pivoted on said arms, a fixed guide-arm 71, a pinion 94 keyed on the said shaft 61, and a manually adjustable setting-lever fulcrumed on the said shaft I and when adjusted, is adapted to govern the adjustment of both the indicator and the pinion with which it is operatively connected, substantially as described.

11. In a cash-register, the combination of a rotatable initial-indicating-wheel, a manually adjustable setting-lever, a registering mechanism, a casing provided with an opening, a horizontal rotary shaft journaled in said casing, a cylindrical construction fast on said shaft, a plurality of receptacles supported by said construction, and means which operatively connect the manually operated setting-lever with both the initial-indicating-wheel and the rotary-shaft, substantially as and for the purpose described.

12. In a cash-register, the combination of operating mechanism which includes indicating devices, a segment gear J which is operatively connected with the same, a pivoted frame 41, registering mechanism which is supported within the said frame, and which includes the gears 43, gears K which operatively connect the registering mechanism with the gears J, latch devices carried on the said gears J, a vertically manually adjustable setting-lever 52, a nose or projection 55 attached to the said setting-lever and which is in the path of said latch devices and adapted to trip the same, star teeth formed on the said gear J, a locking tooth formed on a lever-arm 36 and which is adapted to engage the said star teeth, a spring which normally holds the locking tooth out of engagement, a rock-shaft 37 to which the lever-arm is keyed, an adjusting-arm 39 keyed on said rock-shaft, a rotary-shaft $C^{12}$, a cam fast on the said rotary shaft and which is adapted to contact with the said adjusting-arm 39 for the purpose of rocking said shaft 37, substantially as described.

13. In a cash-register, the combination with a casing surrounding a rotatable construction containing a plurality of pivoted receptacles, said casing having an opening in the front portion, of means for covering and uncovering said opening, which consists of an oval front construction 74 pivoted on the shaft 61, means for holding the cover down, consisting of the pivoted dog 76 engaging the abutment 77, and means for releasing the cover, including the pin 79 which contacts with the said dog 76 at each operation of the machine, of means for locking the rotatable construction while the cover is open, consisting of the pivoted lever 83 provided with a hook portion $83^a$ which is adapted to engage one of the recesses $83^c$, through the medium of the bar 86, and of means for holding the pivoted receptacles rigidly in their normal position, consisting of the pendent arms 68 the antifriction rollers 69 and the guide arm 71, substantially as described.

14. In a cash register, the combination with indicating devices and mechanism for operating the same, of two series of rotatable indicator-wheels which are loosely mounted upon independent horizontal shafts, the said shafts supported in the frame of the machine at obtuse angles, and in opposite directions, in relation to the front thereof, substantially as described.

15. In a cash-register, the combination with indicating means and devices for operating the same, of a series of rotatable indicator-wheels loosely mounted upon a horizontal shaft which is supported in the frame work of, and extends parallel with, the front of the machine, a second series of rotatable indicator-wheels loosely mounted upon a horizontal shaft which is supported in the frame of the machine, and extends from the right of, and at an obtuse angle relative to the first named shaft, and a third series of rotatable indicator-wheels loosely mounted upon a horizontal shaft, which is supported in the frame of the machine, and extends from the left of, and at an obtuse angle in relation to the first named shaft, substantially as described.

16. In a cash-register, the combination with a series of slidable racks, a like series of horizontal bars attached, and means for reciprocating them vertically, of two series of rotatable indicator-wheels loosely mounted upon independent horizontal shafts, which are supported in the frame of the machine at obtuse angles, and in different directions, in relation to the front of said machine, and means for operatively connecting the indicator-wheels with the slidable racks, substantially as described.

17. In a cash-register, the combination with operating mechanism, which includes key elements, of two series of indicator-wheels representing identical characters, mounted upon two different horizontal shafts, which are supported in the frame of the machine in the same plane, but at obtuse angles, and in opposite directions, relative to the front of the said machine, and means which operatively connect the key elements and indicator-wheels, whereby wheels on each shaft, representing the same characters, are adjusted simultaneously, and corresponding to the key element with which they are operatively connected, substantially as described.

18. In a cash-register, the combination of indicating means, which includes rotatable wheels having their periphery inscribed to indicate different transactions, and mounted loosely upon a shaft that is supported in the upper portion of the frame of the machine and parallel with the front of it, and two series of rotatable wheels, having their peripheries inscribed with numerals representing the same values, which are mounted upon independent shafts that are supported in the upper portion of the frame, and each extending at an obtuse angle from, and in an opposite direction, in relation to the first named shaft, and means for actuating said wheels, substantially as described.

19. In a cash-register, the combination with operating mechanism, of two series of rotatable value-indicator-wheels, their peripheries inscribed with numerals denoting identical values, and each of said series loosely mounted upon independent horizontal shafts, which are secured to the frame of the machine at obtuse angles, and in different directions in relation to the front of said machine, and means whereby wheels of each series, denoting corresponding values, are adjusted simultaneously, substantially as described.

20. In a cash-register, the combination with operating mechanism, the same including a series of slidable racks with a like series of horizontal bars attached, of a series of rotatable indicator-wheels loosely mounted upon a horizontal shaft which is supported in the frame of the machine and parallel with the front thereof, a second series of rotatable indicator-wheels loosely mounted upon a horizontal shaft, which is supported in the frame of the machine, and extending from the right of, and at an obtuse angle relative to the first named shaft, a third series of rotatable indicator-wheels, which are loosely mounted upon a horizontal shaft, supported in the frame and extending from the left of, and at an obtuse angle in relation to the first named shaft, and means which operatively connect the indicator-wheels with the slidable racks, substantially as described.

21. In a cash-register, the combination with operating mechanism, of indicating means which include two series of indicators inscribed with figures denoting identical values, the said series of indicators arranged in the machine parallel with and opposite independent openings, the said openings extending at an obtuse angle from, and in opposite directions relative to the front of the machine, and means for adjusting said indicators, substantially as described.

22. In a cash-register, the combination with operating mechanism, of indicating means including a series of indicators arranged parallel with and opposite a vertical opening in the front casing of the machine, a second series of indicators arranged parallel with and opposite a vertical opening in the casing, extending from the right of, and at an obtuse angle relative to the first named opening, and a third series of indicators aranged parallel with, and opposite a vertical opening in the casing, extending from the left of, and at an obtuse angle relative to the first named opening, and means for adjusting said indicators, substantially as described.

23. In a cash register, the combination with a movable frame and a registering mechanism carried thereby, of actuating gears for said mechanism, a reciprocatory member for moving the frame to carry the registering mechanism into and out of mesh with the actuating gears, a bar having an enlarged portion connecting the movable frame and reciprocatory member, and a manipulative device controlling the movement of said bar to disable or enable the registering mechanism.

24. In a cash register, the combination with a movable frame and a registering mechanism carried thereby, of actuating gears for said mechanism, a reciprocatory member for moving the frame to carry the registering mechanism into and out of mesh with the actuating gears, projections carried by the frame and reciprocatory member, a bar with an enlarged portion normally interposed between the projections of the frame and said member for connecting the same, and an adjustable lever for moving said bar to disconnect said frame and member so that the actuating gear may be moved without operating the registering mechanism.

25. In a cash register, the combination with a money receptacle divided into a plurality of compartments, each compartment having a tiltable tray, of means for moving said receptacle to expose any compartment, and means preventing the tray of the exposed compartment from tilting.

26. In a cash register, the combination with a money receptacle divided into a plurality of compartments, each compartment having several tiltable trays, of an adjustable lever for moving said receptacle to expose any compartment, and means preventing the trays of the exposed compartment from tilting.

27. In a cash register, the combination with a money receptacle divided into a plurality of compartments, each compartment having several tiltable trays, of an adjustable lever for moving said receptacle to expose any compartment, devices connected to each tray, and a stationary bar with which the devices of the trays of the exposed compartment engage to prevent the tilting of said trays.

28. In a cash register, the combination with a cash receptacle divided into a plurality of compartments, each compartment having a tiltable tray, of a casing for said receptacle, the said casing having an opening therein, a lid normally covering said opening, means for moving said receptacle to bring any compartment adjacent to the opening, and means for moving the lid to uncover the opening to expose the compartment adjacent thereto.

29. In a cash register, the combination with a rotary cash receptacle divided into a plurality of compartments, each having several tiltable trays, of a casing for said receptacle, the said casing having an opening therein, a lid normally covering the opening, an adjustable lever for moving said receptacle to bring any compartment adjacent to the opening, means for preventing the tilting of the trays of the compartment adjacent to the opening, and means for moving the lid to uncover the opening to expose the compartment adjacent thereto.

30. In a cash register, the combination with a movable member, of means for moving said member, and a spring controlled brake connected to said member and means, the tension of said spring increasing as the moving means nears the limit of its movement in opposite directions so as to retard the movement of said member.

31. In a cash register, the combination with a rotary cash receptacle divided into a plurality of compartments, of a pivot therefor, an oscillatory operating means for said receptacle, and a spring controlled brake connected to the pivot and operating means, the tension of said spring increasing as the operating means nears the limit of its movement in opposite directions so as to retard the movement of said receptacle.

32. In a cash register, the combination with a differentially adjustable indicating mechanism, of a rotatable cash receptacle, means for preliminarily rotating said cash receptacle and predetermining the adjustment of the indicating mechanism and means operated upon the operation of the machine for adjusting said mechanism to its predetermined position.

33. In a cash register, the combination with a differentially adjustable indicating mechanism, of means operable differentially upon the operation of the machine for positioning the indicating mechanism; a rotatable cash receptacle, means for preliminarily adjusting said receptacle differentially, and a single stop carried by said adjusting means and coöperating with said positioning means for the indicating mechanism to predetermine the adjustment of said indicating mechanism.

JOHN F. PARKER.

Witnesses:
M. L. McDonald,
C. H. Ballard.